(12) United States Patent
Aoki et al.

(10) Patent No.: US 9,255,693 B2
(45) Date of Patent: Feb. 9, 2016

(54) FLUORESCENT SCREEN AND IMAGE DISPLAY DEVICE COMPRISING SAME

(75) Inventors: Kazuhiko Aoki, Tokyo (JP); Fujio Okumura, Tokyo (JP)

(73) Assignee: NEC CORPORATION, Tokyo (JP)

(*) Notice: Subject to any disclaimer, the term of this patent is extended or adjusted under 35 U.S.C. 154(b) by 269 days.

(21) Appl. No.: 13/978,525

(22) PCT Filed: Jan. 30, 2012

(86) PCT No.: PCT/JP2012/051962
§ 371 (c)(1),
(2), (4) Date: Jul. 5, 2013

(87) PCT Pub. No.: WO2012/105484
PCT Pub. Date: Aug. 9, 2012

(65) Prior Publication Data
US 2013/0285559 A1    Oct. 31, 2013

(30) Foreign Application Priority Data
Jan. 31, 2011    (JP) .................................. 2011-018387

(51) Int. Cl.
| F21V 11/14 | (2006.01) |
| H01J 29/20 | (2006.01) |
| G03B 21/60 | (2014.01) |
| H04N 9/31 | (2006.01) |

(52) U.S. Cl.
CPC ................ F21V 11/14 (2013.01); G03B 21/60 (2013.01); H01J 29/20 (2013.01); H04N 9/3129 (2013.01)

(58) Field of Classification Search
USPC ................................................. 315/149–159
See application file for complete search history.

(56) References Cited

U.S. PATENT DOCUMENTS

| 2007/0046176 A1* | 3/2007 | Bukesov et al. ............... 313/496 |
| 2007/0187616 A1* | 8/2007 | Burroughs et al. ......... 250/458.1 |
| 2008/0203901 A1* | 8/2008 | Bukesov et al. ............... 313/503 |
| 2008/0291140 A1* | 11/2008 | Kent et al. ......................... 345/83 |
| 2009/0116107 A1* | 5/2009 | Kindler et al. ................. 359/457 |
| 2010/0020290 A1* | 1/2010 | Kemp et al. ....................... 353/31 |
| 2010/0253600 A1* | 10/2010 | Seder et al. ....................... 345/7 |
| 2013/0285559 A1* | 10/2013 | Aoki et al. .................... 315/158 |

FOREIGN PATENT DOCUMENTS

| JP | 06-089075 A | 3/1994 |
| JP | 2002-031853 A | 1/2002 |
| JP | 2008-538145 A | 10/2008 |
| JP | 2009-539120 A | 11/2009 |
| JP | 2010-524019 A | 7/2010 |
| JP | 2010-527464 A | 8/2010 |

OTHER PUBLICATIONS

International Search Report dated Mar. 6, 2012 in PCT/JP2012/051962, with English translation thereof.

* cited by examiner

*Primary Examiner* — Brandon S Cole
(74) *Attorney, Agent, or Firm* — McGinn IP Law Group PLLC

(57) ABSTRACT

A fluorescent screen includes a phosphor layer including a phosphor that absorbs excitation light to emit fluorescence, a reflecting layer that is provided on one surface of the phosphor layer so as to transmit the excitation light and to reflect, to the phosphor layer, a part of fluorescence that is emitted from the phosphor and that exits from the one surface; and a plurality of holes that penetrates the reflecting layer.

19 Claims, 8 Drawing Sheets

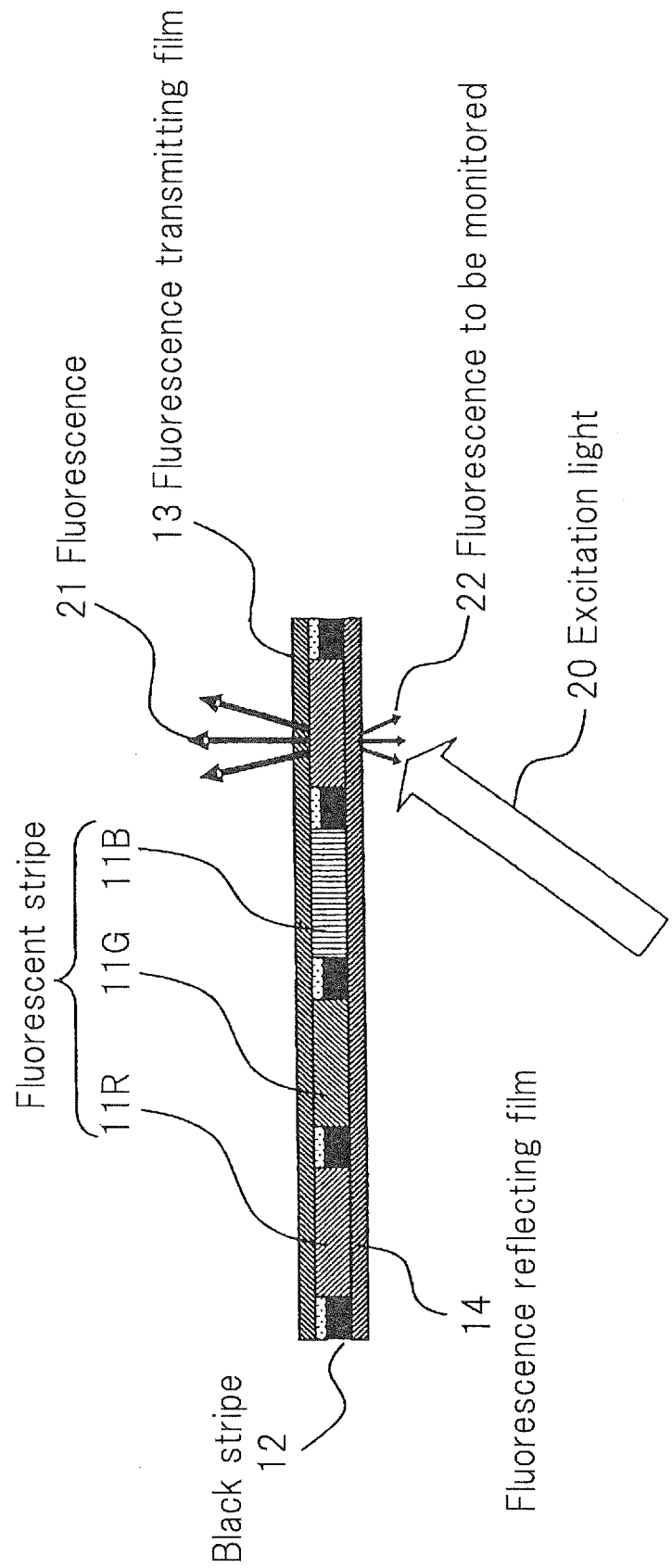

341 Hole

14

Film substrate
343

341

342
Fluorescence
reflecting film

FLUORESCENT SCREEN AND IMAGE DISPLAY DEVICE COMPRISING SAME

TECHNICAL FIELD

The present invention relates to a fluorescent screen provided with a phosphor layer including a phosphor which absorbs excitation light to generate fluorescence (visible light), and also relates to an image display device provided with the fluorescent screen.

BACKGROUND ART

Generally, in an image display device provided with a fluorescent screen, excitation light is irradiated from one surface side of the fluorescent screen, and fluorescence (fluorescent image) is observed from the other surface side of the fluorescent screen.

In a phosphor layer, fluorescence emitted from a phosphor exits from both surfaces (front and rear surfaces) of the phosphor layer, and an image is formed by the fluorescence that exits from the front surface of the phosphor layer. In this case, the fluorescence that exits from the rear surface of the phosphor layer does not contribute to image formation, and hence ight utilization efficiency of fluorescence is reduced.

Patent Literature 1 discloses a fluorescent screen which can improve the utilization efficiency of fluorescence. The fluorescent screen includes a visible light reflecting layer which transmits excitation light and which reflects visible light, and a phosphor layer formed on the visible light reflecting layer.

The excitation light is irradiated from the side of the visible light reflecting layer of the fluorescent screen, and the phosphor in the phosphor layer is excited by the excitation light transmitted through the visible light reflecting layer. The fluorescence emitted from the phosphor and propagating toward the surface of the phosphor layer, whose surface is located on the side of the visible light reflecting layer, is reflected by the visible light reflecting layer in the direction of the phosphor layer. In this case, in addition to the fluorescence that is emitted from the phosphor and that exits from the surface of the phosphor layer, whose surface is located on the side opposite to the visible light reflecting layer, the fluorescence reflected by the visible light reflecting layer also contributes to the image formation, and hence light utilization efficiency is improved.

Patent Literature 2 discloses another fluorescent screen. This fluorescent screen includes a phosphor layer, and a reflecting layer which is provided to face the phosphor layer and which reflects excitation light and visible light. The reflecting layer has an opening to restrict the region of the phosphor layer, onto which region the excitation light is irradiated.

The excitation light passes through the opening of the reflecting layer, so as to be irradiated onto the phosphor layer. In the phosphor layer, fluorescence is emitted from the phosphor in which the excitation light is absorbed. The emitted fluorescence propagates toward the surface of the phosphor layer, whose surface is located on the side of the reflecting layer, and also the emitted fluorescence propagates toward the surface of the phosphor layer, whose surface is located on the side opposite to the reflecting layer. The fluorescence that propagates toward the surface of the phosphor layer, whose surface is located on the side of the reflecting layer, is reflected by the reflecting layer in the direction of the phosphor layer. Also, in this case, similarly to the fluorescent screen described in Patent Literature 1, light utilization efficiency of fluorescence can be improved.

In the fluorescent screens described in Patent Literatures 1 and 2 described above, a dielectric multilayer film can be used as the visible light reflecting layer and the reflecting layer.

CITATION LIST

Patent Literature

Patent Literature 1: JP06-089075A
Patent Literature 2: JP 2008-538145A

SUMMARY OF INVENTION

Generally, in an image display device which displays a fluorescent image by scanning the fluorescent screen of the image display device with excitation light, the in-plane uniformity in the amount of fluorescence on the fluorescent screen is reduced due to various factors, such as environmental variations such as variations in temperature and humidity, distortion of the fluorescent screen, and a secular change in the phosphor. Here, the in-plane uniformity in the amount of fluorescence means that the amount of fluorescence in the surface of the fluorescent screen is constant, for example, when the fluorescent screen is scanned with a constant amount of excitation light.

When the in-plane uniformity in the amount of fluorescence is reduced, the amount of excitation light required to obtain a predetermined amount of fluorescence is different for different in-plane positions. As a result, the color reproducibility of a fluorescent image formed on the fluorescent screen is reduced.

In order to prevent a reduction in the color reproducibility of a fluorescent image, it is necessary to periodically calibrate the amount of excitation light to correspond with the in-plane positions on the fluorescent screen to thereby maintain the in-plane uniformity in the amount of fluorescence.

When calibrating the amount of excitation light, for example, one surface (rear surface) of the fluorescent screen is scanned with a constant amount of excitation light, and the fluorescence that exits from the one surface is detected by light detection means. Then, on the basis of the result detected by the light detection means, the amount of excitation light (or power of an excitation light source) is adjusted to correspond with the in-plane positions so that the amount of fluorescence becomes a predetermined value over the whole surface of the fluorescent screen.

The in-plane variation in the amount of fluorescence that exits from the one surface (rear surface) of the fluorescent screen coincides with the in-plane variation in the amount of fluorescence that exits from the other surface (front surface) of the fluorescent screen. Usually, the above-described calibration of the amount of excitation light is performed in such a manner that the light detection means is arranged at a position facing the surface (rear surface) of the fluorescent screen, whose surface is located on the side of the excitation light source, and that fluorescence that exits from the surface (rear surface) of the fluorescent screen, whose surface is located on the side of the excitation light source, is detected by the light detection means.

In the fluorescent screen described in each of Patent Literatures 1 and 2, the utilization efficiency of fluorescence can be improved, but there are the following problems when the above-described calibration of the amount of excitation light is performed.

When the amount of excitation light is calibrated as described above in the fluorescent screen described in each of Patent Literatures 1 and 2, it is necessary that excitation light be irradiated from the side of the surface (rear surface) of the fluorescent screen, on whose surface the dielectric multilayer film (such as a visible light reflecting layer and a reflecting layer) is provided, and that a part of fluorescence that propagates from the phosphor layer to the dielectric multilayer film be detected as fluorescence that is to be monitored. For this reason, the dielectric multilayer film is formed to have spectral transmission characteristics in which the transmittance with respect to the excitation light is about 100% and in which the transmittance with respect to the fluorescence is about several percent.

Generally, the dielectric multilayer film is formed by alternately depositing first and second dielectric films having different refractive indexes, and the spectral transmission characteristics of the dielectric multilayer film are determined by the film thickness and the refractive index of each of the first and second dielectric films.

When the film thickness of the first and second dielectric films is uniform, the in-plane variation in the transmittance with respect to the excitation light and the fluorescence does not occur. However, it is difficult to accurately form the dielectric multilayer film by alternately depositing first and second dielectric films each having a uniform thickness.

When the film thickness of each of the first and second dielectric films is not uniform, the transmittance (or reflectance) with respect to the excitation light and the fluorescence is different for different in-plane positions of each of the films. For this reason, the amounts of the fluorescence and the excitation light, which are transmitted through the dielectric multilayer film, are different between the in-plane positions.

For example, when a dielectric multilayer film is formed so that the in-plane variation in the reflectance with respect to fluorescence is within the range of 99%±0.3% (standard deviation 3σ), the in-plane variation in the transmittance of the dielectric multilayer film with respect to fluorescence is within the range of 1%±0.3% (standard deviation 3σ). In this case, the in-plane variation in the amount of fluorescence transmitted through the dielectric multilayer film is within the range of ±30%, and hence it is difficult to accurately detect variation in the amount of fluorescence in the surface of the fluorescent screen on the basis of the amount of fluorescence transmitted through the dielectric multilayer film.

On the other hand, when the in-plane variation in the transmittance with respect to the excitation light is set within the range of, for example, 99%±0.3% (standard deviation 3σ), the in-plane variation in the amount of excitation light transmitted through the dielectric multilayer film is within the range of ±0.3%. In this way, the in-plane variation in the amount of excitation light due to the non-uniformity in the thickness of the first and second dielectric films is very small, and hence the in-plane variation in the amount of excitation light has almost no effect when the amount of fluorescence transmitted through the dielectric multilayer film is detected.

As described above, in the fluorescent screen described in each of Patent Literatures 1 and 2, the in-plane variation in the transmittance with respect to fluorescence due to the non-uniformity in thickness of each of the films constituting the dielectric multilayer film is large. Therefore, when the amount of excitation light is calibrated, it is difficult to accurately detect the in-plane variation in the amount of fluorescence.

An object of the present invention is to provide a fluorescent screen which can improve the utilization efficiency of fluorescence and which can also accurately detect the in-plane variation in the amount of fluorescence at the time of calibrating the amount of excitation light, and also to provide an image display device using the fluorescent screen.

In order to achieve the above-described object, a fluorescent screen according to the present invention includes:

a phosphor layer that includes a phosphor which absorbs excitation light to emit fluorescence;

a reflecting layer that is provided on one surface of the phosphor layer so as to transmit the excitation light and to reflect, to the phosphor layer, a part of fluorescence that is emitted from the phosphor and that exits from the one surface; and a plurality of holes that penetrate the reflecting layer.

An image display device according to the present invention, which is provided with the above-described fluorescent screen having a plurality of pixels, the image display device including:

an excitation light source that outputs excitation light;

a scanning section that scans one surface of the fluorescent screen with the excitation light outputted from the excitation light source;

a light detecting section that detects fluorescence that exits from the one surface of the fluorescent screen; and a control section that makes the excitation light source emit a constant amount of excitation light, makes the scanning section perform the scanning operation, acquires the amount of fluorescence in each of the pixels of the fluorescent screen on the basis of the output value of the light detecting section, and adjusts the amount of excitation light so that the acquired amount of fluorescence of each pixel becomes a predetermined value.

BRIEF DESCRIPTION OF DRAWINGS

FIG. 1 is a sectional view schematically showing a configuration of a fluorescent screen which is a first exemplary embodiment.

Figure 2A:
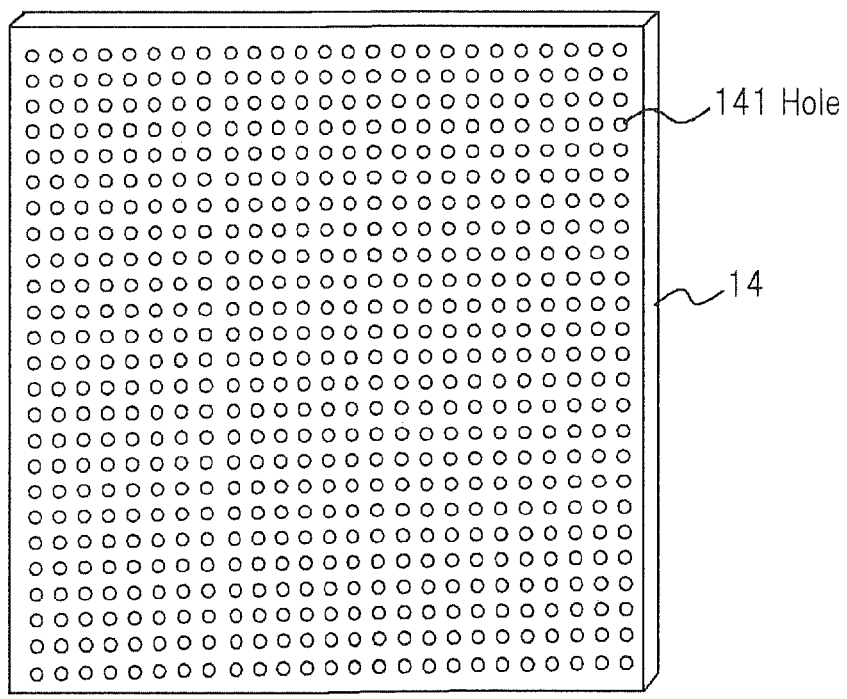
FIG. 2A is a perspective view showing the fluorescence reflecting film of the fluorescent screen shown in FIG. 1.

REFERENCE SIGNS LIST 11R, 11G, 11B Fluorescent stripe
12 Black stripe
13 Fluorescence transmitting film
14 Fluorescence reflecting film
20 Excitation light 21 Fluorescence
141 Hole
142 Fluorescence reflecting layer
143 Film substrate

DESCRIPTION OF EMBODIMENTS

In the following, exemplary embodiments will be described with reference to the accompanying drawings.

First Exemplary Embodiment

FIG. 1 is a sectional view schematically showing a configuration of a fluorescent screen which is a first exemplary embodiment.

As shown in FIG. 1, the fluorescent screen is used in a rear projection type image display device, and includes black stripes 12, fluorescence transmitting film 13, fluorescence reflecting film 14, and fluorescent stripes 11R, 11G, and 11B.

Black stripes 12 and fluorescent stripes 11R, 11G and 11B are formed on the surface of fluorescence reflecting film 14. Fluorescent stripes 11R, 11G and 11B are arranged periodically in the in-plane direction, and black stripe 12 is formed in each of the regions between fluorescent stripes 11R, 11G and 11B. In other words, fluorescent stripes 11R, 11G and 11B are provided in the regions which are each partitioned in a stripe shape or a matrix shape by black stripes 12.

Fluorescent stripe 11R is a region in which a phosphor that emits red fluorescence by being excited by excitation light is formed. Fluorescent stripe 11G is a region in which a phosphor that emits green fluorescence by being excited by excitation light is formed. Fluorescent stripe 11B is a region in which a phosphor that emits blue fluorescence by being excited by excitation light is formed. In the example shown in FIG. 1, fluorescent stripes 11R, 11G and 11B are formed periodically in this order in a specific direction.

Fluorescent stripes 11R, 11G and 11B, and black stripes 12, which are formed on fluorescence reflecting film 14, are covered with fluorescence transmitting film 13. In other words, the phosphor layer formed by fluorescent stripes 11R, 11G and 11B is sandwiched between fluorescence transmitting film 13 and fluorescence reflecting film 14.

Fluorescence transmitting film 13 has spectral transmission characteristics which absorb or reflect excitation light and which transmit at least the fluorescence of each color emitted from each of fluorescent stripes 11R, 11G, and 11B. Fluorescence transmitting film 13 is formed of, for example, a dielectric multilayer film.

Fluorescence reflecting film 14 has spectral transmission characteristics which transmit excitation light and which reflect the fluorescence of each color emitted from each of fluorescent stripes 11R, 11G, and 11B. Also, fluorescence reflecting film 14 has a plurality of holes arranged periodically in the in-plane direction.

Figure 2B:
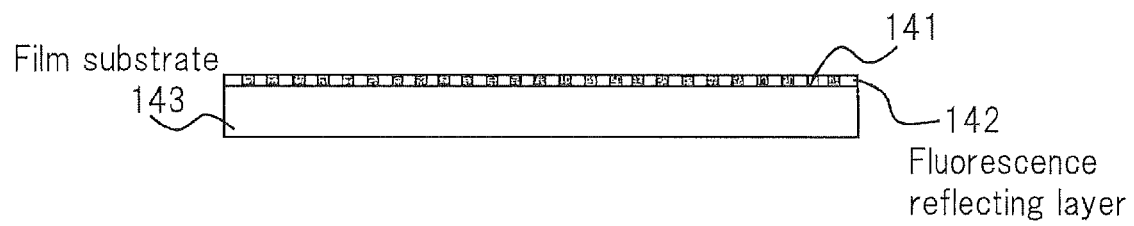
FIG. 2B is a sectional view showing the fluorescence reflecting film of the fluorescent screen shown in FIG. 1.

FIG. 2A is a perspective view of fluorescence reflecting film 14, and FIG. 2B is a cross-sectional view of fluorescence reflecting film 14.

As shown in FIG. 2A and FIG. 2B, fluorescence reflecting film 14 includes film substrate 143, and fluorescence reflecting layer 142 which is formed on film substrate 143 and which is provided with a plurality of holes 141. Fluorescence reflecting layer 142 is formed of a dielectric multilayer film. The thickness of film substrate 143 is suitably set in the range of, for example, several tens μm to several hundreds μm.

Holes 141 are formed so as to be uniformly distributed. In FIG. 2A, holes 141 are formed periodically in the in-plane direction of fluorescence reflecting layer 142.

Figure 2C:
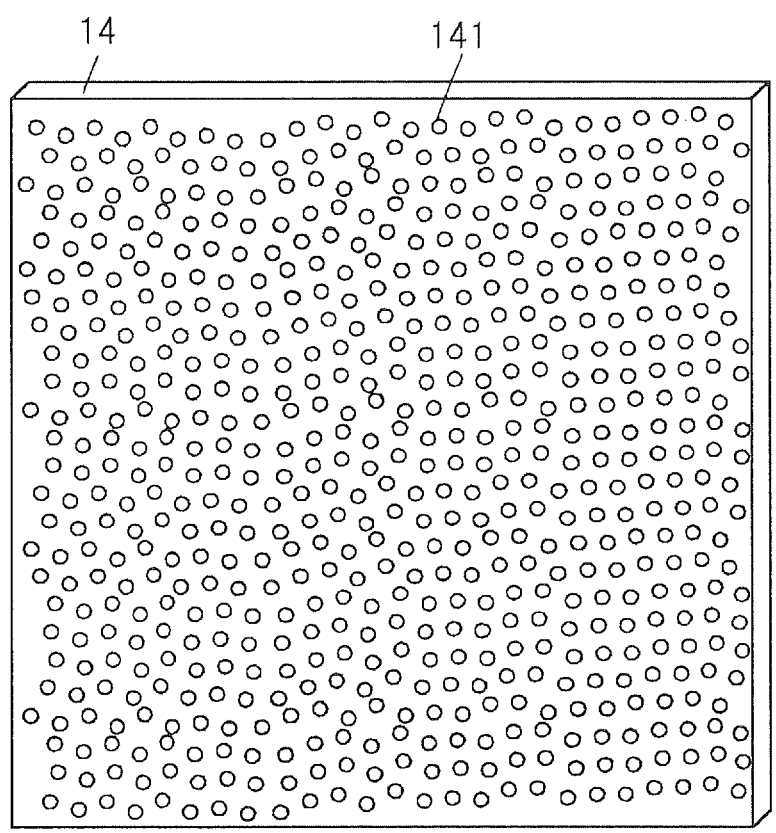
FIG. 2C is a perspective view showing another example of the fluorescence reflecting film of the fluorescent screen shown in FIG. 1.

FIG. 2C is another perspective view of fluorescence reflecting film 14. In FIG. 2C, holes 141 are formed at random positions uniformly distributed in the in-plane direction.

In the case where about one hundred or more holes 141 are located within the beam spot of excitation light irradiated onto fluorescence reflecting film 14, even when the beam spot is moved, the variation in transmittance due to holes 141 going in and out of the beam spot can be reduced to 1% or less. When the number of holes 141 located within the beam spot of excitation light is determined, the size and density of holes 141 can be obtained from the area of the excitation light beam spot formed on fluorescence reflecting film 14, and from the transmittance with respect to fluorescence (the ratio of the total area of holes 141 with respect to the area of fluorescence reflecting layer 142) required for fluorescence reflecting film 14. At this time, it is preferred that the transmittance with respect to fluorescence be set to about 3 to 10%.

For example, when the number of holes 141 located within the excitation light beam spot is one hundred, and when the area of the excitation light beam spot formed on fluorescence reflecting film 14 is 0.04 $mm^2$, and when the transmittance of fluorescence reflecting film 14 with respect to fluorescence is 8.4%, the density of holes 141 is 2500 (holes)/$mm^2$, and the diameter ϕ of holes 141 is 6.5 μm. Further, as shown in FIG. 2A, when holes 141 are formed periodically in the in-plane direction, the distance between the centers of holes 141 adjacent to each other is 20 μm.

Figure 3:
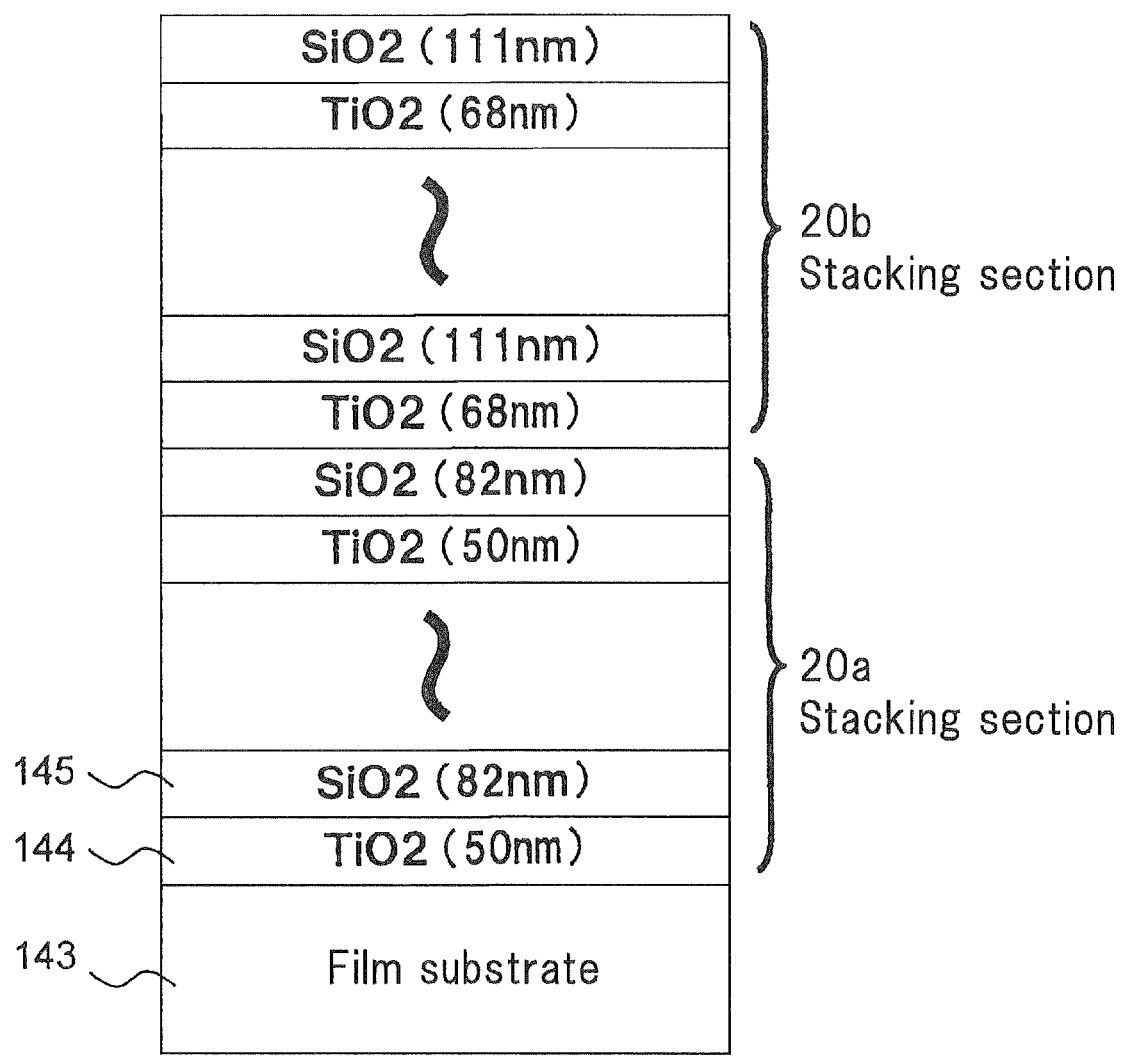
FIG. 3 is a schematic view showing an example of a dielectric multilayer film constituting the fluorescence reflecting layer of the fluorescent reflection film shown in FIG. 2B.

FIG. 3 shows an example of a dielectric multilayer film constituting fluorescence reflecting layer 142.

As shown in FIG. 3, fluorescence reflecting film 14 includes film substrate 143, and stacking sections 20a and 20b each of which is formed on film substrate 143 by alternately depositing $TiO_2$ 144 (refractive index n=2.40) and $SiO_2$ 145 (refractive index n=1.46). Stacking sections 20a and 20b constitute fluorescence reflecting layer 142 shown in FIG. 2B.

Stacking section 20a is formed by alternately depositing $TiO_2$ 144 having a film thickness of 50 nm, and $SiO_2$ 145 having a film thickness of 82 nm. In stacking section 20a, the number of the stacking layers is 20. Stacking section 20b is formed by alternately depositing $TiO_2$ 144 having a film thickness of 68 nm, and $SiO_2$ 145 having a film thickness of 111 nm. In stacking section 20b, the number of the stacking layers is 20.

Film substrate 143 is formed of a material, for example, acrylic (refractive index n=1.49), which has spectral transmission characteristics that transmit the excitation light and the fluorescence of each color that is emitted from each of fluorescent stripes 11R, 11G and 11B. Fluorescent stripes 11R, 11G and 11B, and black stripes 12 are formed on the surface of fluorescence reflecting film 14, whose surface is located on the side of fluorescence reflecting layer 142.

Figure 4:
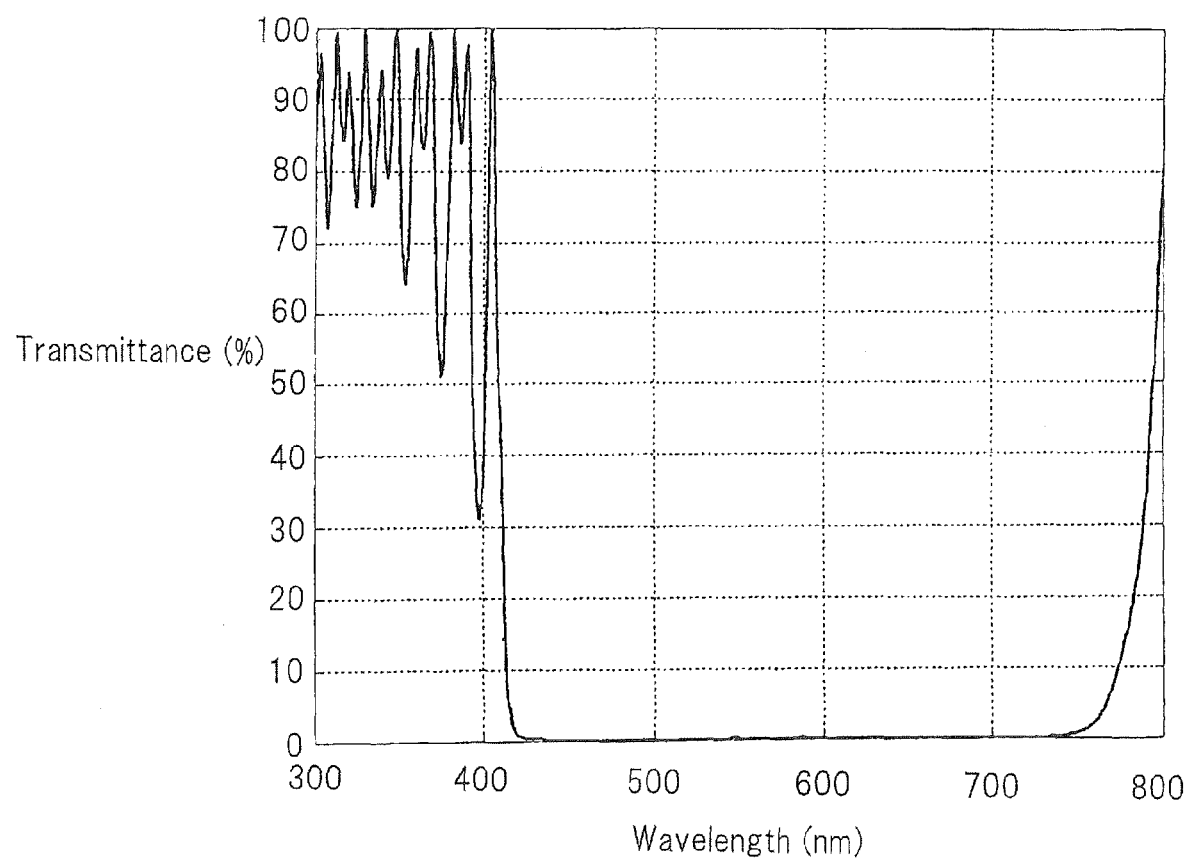
FIG. 4 is a characteristic diagram showing an example of spectral transmission characteristics of the fluorescence reflecting layer shown in FIG. 3.

FIG. 4 shows an example of the spectral transmission characteristics of fluorescence reflecting layer 142 shown in FIG. 3. The vertical axis represents the transmittance (%), and the horizontal axis represents the wavelength (nm). The average transmittance for light in the wavelength region (450 nm to 700 nm) corresponding to the wavelength of fluorescence is 0.042%. The transmittance at the wavelength of 405 nm corresponding to the wavelength of excitation light is 99.9%.

As shown in FIG. 1, in the fluorescent screen according to the exemplary embodiment, excitation light 20 is irradiated from the side of fluorescence reflecting film 14 of the fluorescent screen. Excitation light 20 is transmitted through fluorescence reflecting film 14.

The phosphor in the phosphor layer (fluorescent stripes 11R, 11G and 11B) is excited by excitation light 20 transmitted through fluorescence reflecting film 14. The fluorescence emitted from the phosphor exits from the phosphor layer surface on the side of fluorescence transmitting film 13, and also exits from the phosphor layer surface on the side of fluorescence reflecting film 14.

A part of the fluorescence that exits from the phosphor layer surface on the side of fluorescence reflecting film 14 passes through holes 141 of fluorescence reflecting layer 142, and the other part of the fluorescence that exits from the phosphor layer surface on the side of fluorescence reflecting film 14 is reflected by fluorescence reflecting layer 142 toward fluorescence transmitting film 13.

The fluorescence that passes through holes 141 of fluorescence reflecting layer 142 is used as fluorescence 22 to be monitored. The fluorescence (including the fluorescence reflected by fluorescence reflecting layer 142) transmitted through fluorescence transmitting film 13 is used as fluorescence 21 which contributes to image formation.

In-plane variations in the transmittance of fluorescence reflecting layer 142 provided with holes 141 with respect to fluorescence include a variation due to the manufacturing variation in the size of holes 141, and a variation due to the non-uniformity in thickness of the dielectric multilayer film.

Here, there are described in-plane variations in the transmittance of fluorescence reflecting layer 142 with respect to fluorescence in the case where the size of holes 141 is designed so that the ratio of the amount of fluorescence that passes through holes 141 with respect to the amount of fluorescence incident on fluorescence reflecting layer 142 is 8.4%.

Fluorescence reflecting layer 142 provided with holes 141 is formed by application of a process, such as the reactive ion etching (RIE) process. In this process, holes 141 are formed by etching using a mask pattern. However, in this case, the variation in the size (diameter) of holes 141 with respect to the design value is at most about 1%, and even when the variation in the size of holes 141 is converted into a variation in the area of holes 141, the converted variation is about 2%. In this case, the in-plane variation in the transmittance with respect to fluorescence due to the variation in the size of holes 141 is in the range of 8.2% to 8.6%.

On the other hand, the variation in the film thickness of each of the films of the dielectric multilayer film constituting fluorescence reflecting layer 142 is, for example, 20%, and the in-plane variation in the transmittance with respect to fluorescence due to the variation in the film thickness is in the range of 0.033% to 0.084%.

The total amount of in-plane variation in the transmittance with respect to fluorescence is obtained by adding the in-plane variation (0.033% to 0.084%) in the transmittance with respect to fluorescence due to the variation in the film thickness to the in-plane variation (8.2% to 8.6%) in the transmittance with respect to fluorescence due to the variation in the size of holes 141. The value of the total amount of in-plane variation in the transmittance with respect to fluorescence is in the range of 8.2% to 8.7% (which corresponds to a variation width of 0.5%).

Figure 5:
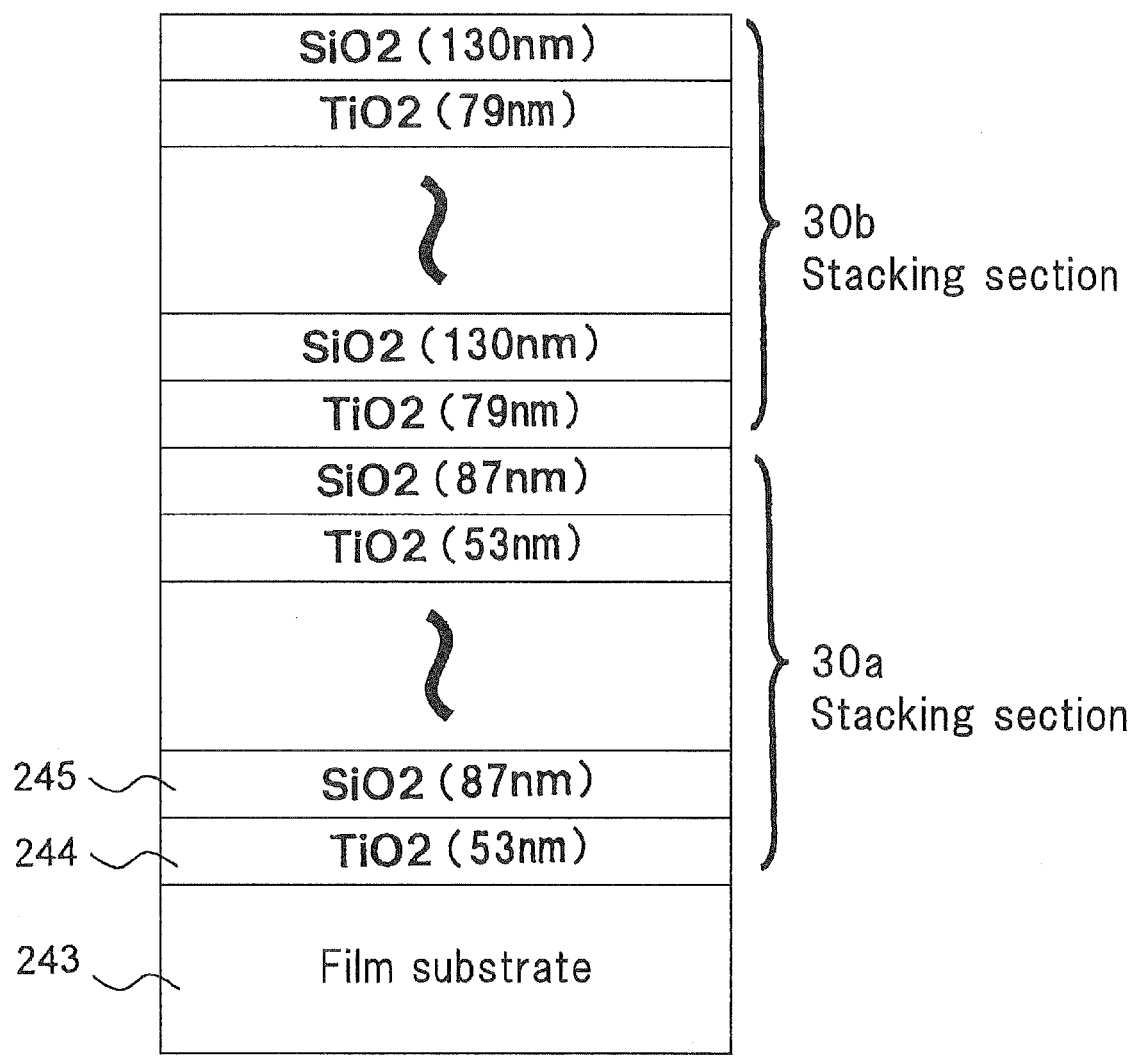
FIG. 5 is a schematic view showing a configuration of a fluorescence reflecting film of a fluorescent screen which is a comparison example.

FIG. 5 shows a configuration of a fluorescence reflecting film of a fluorescent screen which is a comparison example. The fluorescence reflecting film is different from fluorescence reflecting film 14 shown in FIG. 2A and FIG. 2B in the spectral transmission characteristics of the dielectric multilayer film, and also has no hole.

The fluorescence reflecting film shown in FIG. 5 includes film substrate 243, and stacking sections 30a and 30b each of which is formed on film substrate 243 by alternately depositing TiO$_2$ 244 (refractive index n=2.40) and SiO$_2$ 245 (refractive index n=1.46). Stacking sections 30a and 30b constitute a fluorescence reflecting layer.

Stacking section 30a is formed by alternately depositing TiO$_2$ 244 having a film thickness of 53 nm, and SiO$_2$ 245 having a film thickness of 87 nm. In stacking section 30a, the number of stacking layers is 8. Stacking section 30b is formed by alternately depositing TiO$_2$ 244 having a film thickness of 53 nm, and SiO$_2$ 245 having a film thickness of 130 nm. In stacking section 30b, the number of stacking layers is 8.

Film substrate 243 is the same as film substrate 143 shown in FIG. 3. In the fluorescence reflecting layer constituted by stacking sections 30a and 30b, the average transmittance for light in the wavelength region of 450 nm to 700 nm that corresponds to the wavelength region of fluorescence is 8.4%, and the transmittance with respect to fluorescence at the wavelength that corresponds to the wavelength of excitation light is 99.2%.

In the fluorescent screen of the comparison example described above, when the variation in thickness of each the films of the dielectric multilayer film constituting the fluorescence reflecting layer is set to 20%, the in-plane variation in the transmittance with respect to fluorescence is in the range of 7.3% to 11.8% (which corresponds to a variation width of 4.5%). This range is very large as compared with the range of 8.2% to 8.7% (which corresponds to a variation width of 0.5%) of the value of the total amount of in-plane variation in the transmittance of the fluorescent screen of the exemplary embodiment with respect to fluorescence.

As can be seen from the above, according to the exemplary embodiment, the width of in-plane variation in the transmittance of fluorescence reflecting layer 142 with respect to fluorescence is 0.5%, and is suppressed to about one-tenth of the width of in-plane variation in the transmittance with respect to fluorescence in the comparison example. In this way, the width of in-plane variation in the transmittance with respect to fluorescence is very small, and hence the in-plane variation of fluorescence 22 to be monitored accurately coincides with the in-plane variation of fluorescence 21. Therefore, the in-plane variation of fluorescence 21 can be accurately detected by detecting the in-plane variation of fluorescence 22 to be monitored.

In addition, the exemplary embodiment is configured to detect the fluorescence that passes through each of holes 141, and hence it is possible to use, as fluorescence reflecting layer 142, a dielectric multilayer film having a high reflectance (for example, a reflectance of 99.9%) with respect to the wavelength of fluorescence. The amount of fluorescence transmitted through the dielectric multilayer film having such high reflectance is very small as compared with the amount of fluorescence that passes through each of the holes of the reflecting layer. Therefore, the in-plane variation in the amount of fluorescence due to the non-uniformity in thickness of each of the films of the dielectric multilayer film has no influence when the fluorescence that passes through each of holes 141 is detected.

Further, according to the exemplary embodiment, a part of fluorescence that exits from the phosphor layer surface on the side of fluorescence reflecting film 14 is reflected by fluorescence reflecting layer 142 toward fluorescence transmitting film 13, and this reflected fluorescence contributes to the image formation. Therefore, the light utilization efficiency of fluorescence is improved.

The fluorescent screen according to the exemplary embodiment is an example, and the configuration of the fluorescent screen may be modified in various ways within the scope of the present invention in a manner that a person skilled in the art can understand.

For example, fluorescence reflecting layer 142 is not limited to those having the configuration shown in FIG. 3 and the characteristics shown in FIG. 4. Fluorescence reflecting layer 142 needs only to be a film constituted by a dielectric multilayer film that includes a predetermined transmittance with respect to each of fluorescence and excitation light. However, it is desired that the in-plane variation width in the transmittance with respect to fluorescence due to the non-uniformity in thickness of the dielectric multilayer film is about ten percent of the in-plane variation width in the transmittance with respect to fluorescence due to the manufacturing variation in the size of holes 141.

Further, holes 141 may be provided only in regions facing fluorescent stripes 11R, 11G and 11B formed on fluorescence reflecting layer 142.

For example, the pixel pitch is 1.5 mm, one sub-pitch is 500 µm, the width of black stripe 12 is 150 µm, and the width of each of fluorescent stripes 11R, 11G and 11B is 350 µm. When the density of holes 141 is set to 10000 (holes)/mm$^2$, one pixel has a longitudinal size of 1.5 mm and a lateral size of 350 µm, and hence 5250 holes (=150×35 holes) 141 are arranged in the region corresponding to each of fluorescent stripes 11R, 11G and 11B.

Second Exemplary Embodiment

A fluorescent screen according to second exemplary embodiment is the same as the fluorescent screen according to the first exemplary embodiment, except that a part of the configuration of fluorescence reflecting film 14 is different.

Figure 6A:
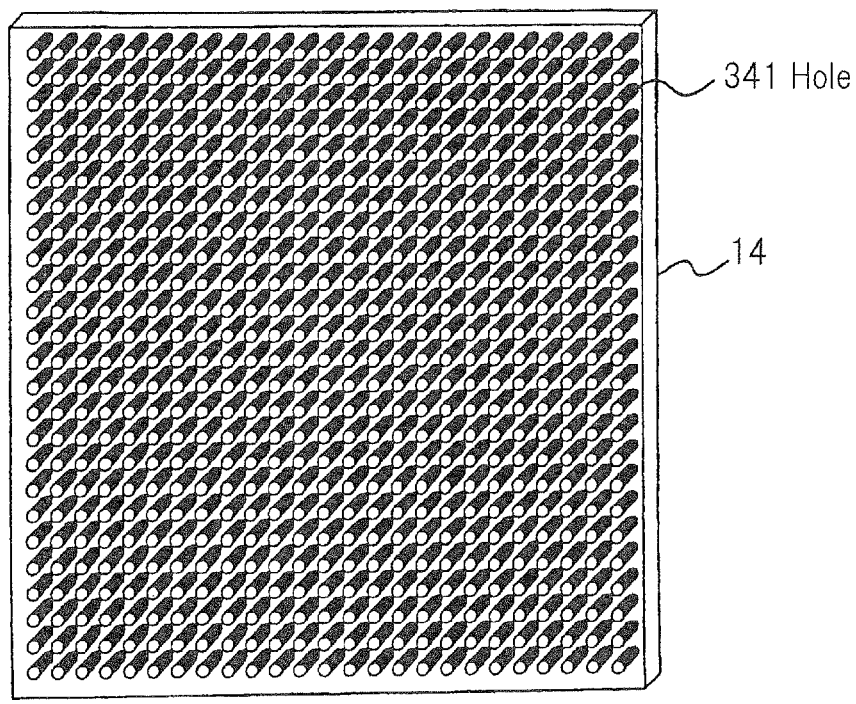
FIG. 6A is a perspective view showing a fluorescence reflecting film of a fluorescent screen which is a second exemplary embodiment.
Figure 6B:
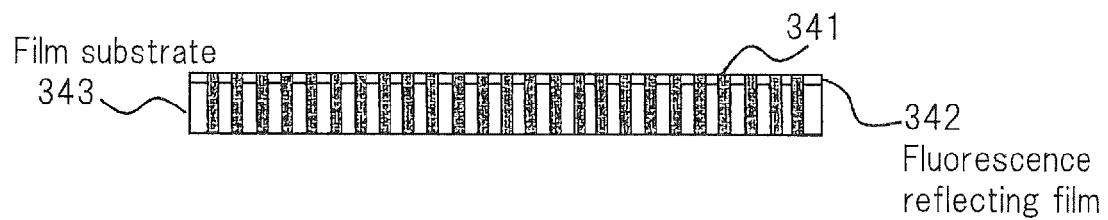
FIG. 6B is a cross-sectional view showing the fluorescence reflecting film of the fluorescent screen which is the second exemplary embodiment.

FIG. 6A is a perspective view of fluorescence reflecting film 14, and FIG. 6B is a cross-sectional view of fluorescence reflecting film 14.

As shown in FIG. 6A and FIG. 6B, fluorescence reflecting film 14 includes film substrate 343, and fluorescence reflecting layer 342 formed on film substrate 343, and a plurality of holes 341 are formed so as to pass through film substrate 343 and fluorescence reflecting layer 342. Film substrate 343 has spectral transmission characteristics which transmit at least excitation light.

The second exemplary embodiment is different from the first exemplary embodiment in that the plurality of holes 341 are formed so as to penetrate film substrate 343 and fluorescence reflecting layer 342. Except for this, the second exemplary embodiment is the same as the first exemplary embodiment described above.

The fluorescent screen according to the second exemplary embodiment has the following effect in addition to the effect of the first exemplary embodiment described above.

In the first exemplary embodiment, holes 141 are formed so as to penetrate only fluorescence reflecting layer 142, and hence it is necessary that film substrate 143 is formed of a material having spectral transmission characteristics that transmit fluorescence.

On the other hand, in the second exemplary embodiment, holes 341 are formed so as to penetrate each of fluorescence reflecting layer 342 and film substrate 343, and hence fluorescence to be monitored can be obtained via holes 341 regardless of the spectral transmission characteristics of film substrate 343. In this case, it is possible to use, as film substrate 343, a material which cannot be used in the first exemplary embodiment, and, for example, a material which reflects or absorbs the fluorescence. Therefore, the degree of freedom in selection of the material of film substrate 343 is increased to be higher than that in the first exemplary embodiment. However, film substrate 343 needs to transmit excitation light, which results in a limitation in selection of the material of film substrate 343.

In the following, there will be described an image display device to which the fluorescent screen according to each of the exemplary embodiments described above can be applied.

Figure 7:
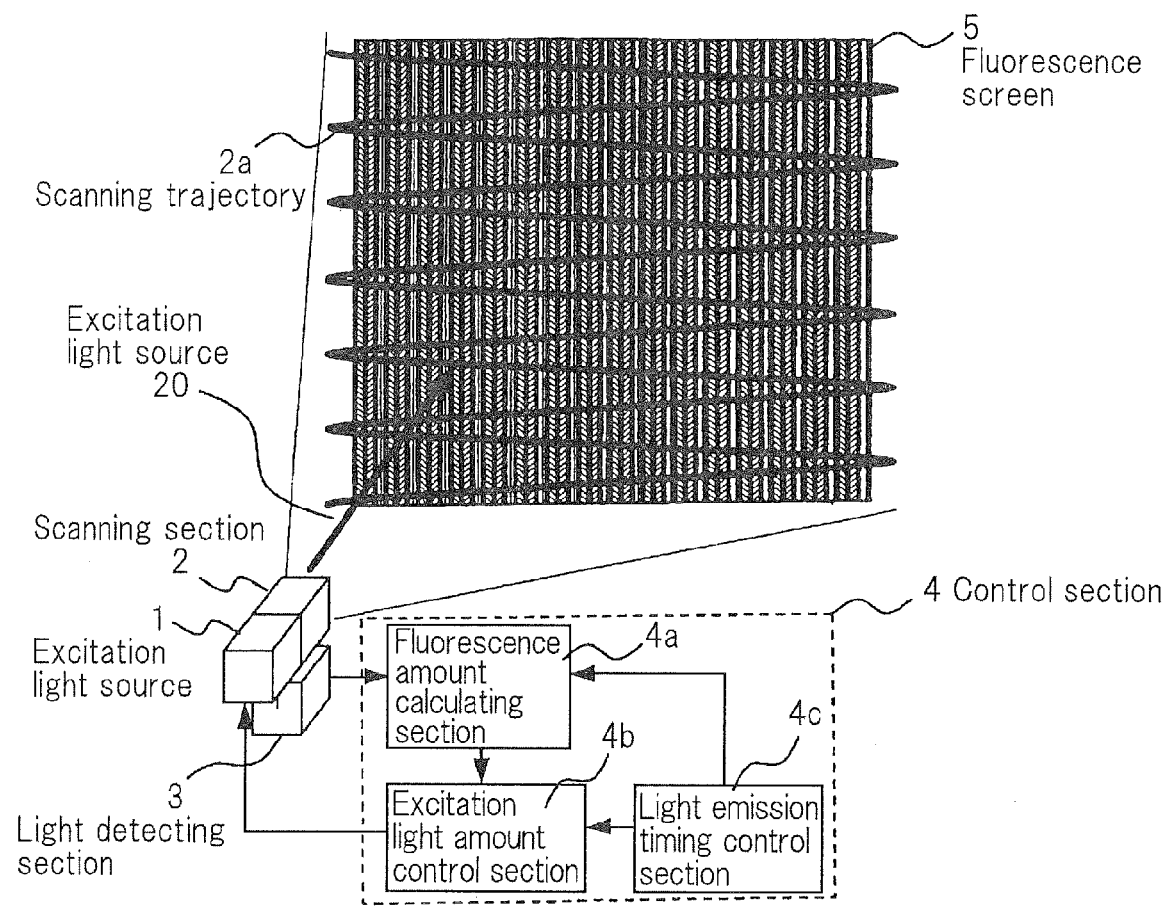
FIG. 7 is a block diagram showing an example of a projection type display device provided with the fluorescent screen according to the present invention.

FIG. 7 shows an example of a projection type display device provided with the fluorescent screen according to the present invention.

As shown in FIG. 7, the image display device is a rear projection type, and includes excitation light source 1, scanning section 2, light detecting section 3, control section 4, and fluorescent screen 5.

Fluorescent screen 5 is configured by the fluorescent screen according to one of the exemplary embodiments described above.

Excitation light source 1 is a laser light source represented by, for example, a laser diode (LD). With the light beam (excitation light) emitted from excitation light source 1, scanning section 2 scans the surface of fluorescent screen 5, whose surface is located on the side of fluorescence reflecting film 14. Scanning section 2 is configured by a polygon mirror, or a resonant mirror, such as a galvano-mirror or a MEMS (Micro Electro Mechanical Systems).

Light detecting section 3 is configured by a photodiode, and is arranged at a position facing the surface of fluorescent screen 5, whose surface is located on the side of fluorescence reflecting film 14. Light detecting section 3 detects fluorescence (fluorescence 22 to be monitored shown in FIG. 1) emitted from fluorescent screen 5.

Control section 4 controls the operation of scanning section 2 and excitation light source 1. Specifically, control section 4 makes excitation light source 1 emit a constant amount of excitation light, so as to enable scanning section 2 to perform the scanning operation. Then, on the basis of the output value of light detecting section 3, control section 4 acquires the amount of fluorescence from each pixel of fluorescent screen 5, and adjusts the power (amount of excitation light) of excitation light source 1 so that the amount of fluorescence acquired from each pixel becomes a predetermined amount.

Control section 4 includes fluorescence amount calculating section 4a, excitation light amount control section 4b, and light emission timing control section 4c.

Light emission timing control section 4c outputs a light emission timing signal for one frame, which represents the light emission timing of excitation light source 1. The light emission timing signal outputted from light emission timing control section 4c is supplied to fluorescence amount calculating section 4a and excitation light amount control section 4b.

On the basis of the light emission timing signal from light emission timing control section 4c, fluorescence amount calculating section 4a acquires an irradiation period of excitation light regarding each of fluorescent stripes 11R, 11G and 11B, and integrates, for each of the irradiation periods, the output value of light detecting section 3 within the irradiation period. The integration value corresponds to the amount of fluorescence 22 to be monitored, which is emitted from fluorescent screen 5 within the irradiation period. Fluorescence amount calculating section 4a supplies the integration value of the output value of light detecting section 3 to excitation light amount control section 4b for each of the irradiation periods.

Excitation light amount control section 4b makes excitation light source 1 emit a constant amount of excitation light at the light emission timing based on the light emission timing signal from light emission timing control section 4c, and acquires the in-plane variation value in the amount of fluorescence 22 to be monitored on the basis of the integration value supplied from light detecting section 3 for each of the irradiation periods. On the basis of the in-plane variation value in the amount of fluorescence 22 to be monitored, excitation light amount control section 4b determines a correction value of the amount of excitation light so as to make the amount of fluorescence 22 to be monitored become a predetermined value, and adjusts the amount of excitation light for the subsequent scanning on the basis of the determined correction value.

Other Exemplary Embodiment

A fluorescent screen according to the other exemplary embodiment includes a phosphor layer including a phosphor which absorbs excitation light to emit fluorescence, a reflecting layer which is provided on one surface of the phosphor layer so as to transmit the excitation light and to reflect, to the phosphor layer, a part of fluorescence that is emitted from the phosphor and that exits from the one surface of the phosphor layer, and a plurality of holes which penetrate the reflecting layer.

In the fluorescent screen according to the other exemplary embodiment, a part of fluorescence that exits from one surface (the surface on the side of the excitation light source) of the phosphor layer is reflected in the direction of the phosphor layer by the reflecting layer. The utilization efficiency of fluorescence can be improved by using the reflected light of fluorescence for image formation.

In addition, a part of fluorescence that exits from one surface (the surface on the side of the excitation light source) of the phosphor layer passes through each of the holes of the reflecting layer, and hence the variation in the amount of fluorescence in the surface of the fluorescent screen (in-plane variation in the amount of fluorescence) can be detected by directly detecting the fluorescence that passes through each of the holes. In this case, the in-plane variation in the amount of fluorescence that passes through each of the holes depends on the manufacturing variation in the size of the holes. However, the manufacturing variation in the size of the holes is small, and hence the in-plane variation in the amount of fluorescence can be accurately detected. Therefore, an image excellent in color reproducibility can be provided.

Further, the fluorescent screen according to the other exemplary embodiment is configured so as to detect fluorescence that passes through each of the holes, and hence a dielectric multilayer film having a high reflectance (for example, reflectance of 99.9%) with respect to the wavelength of fluorescence can be used as the reflecting layer. The amount of fluorescence transmitted through the dielectric multilayer film having such high reflectance is very small as compared with the amount of fluorescence that passes through each of the holes of reflecting layer, and hence the in-plane variation in the amount of fluorescence due to the non-uniformity in thickness of each of the films of the dielectric multilayer film has no effect when the fluorescence that passes through each of the holes is detected.

The fluorescent screen according to the other exemplary embodiment can also be used as fluorescent screen 5 of the projection type display device as shown in FIG. 7.

The other exemplary embodiment may further include a substrate that transmits the excitation light and that is provided on the surface of the reflecting layer, whose surface is located on the side opposite to the surface of the phosphor layer. This corresponds to the first exemplary embodiment.

In the above-described case, the plurality of holes may be formed so as to penetrate the reflecting layer and the substrate. This corresponds to the second exemplary embodiment.

Further, the plurality of holes may be provided periodically in the in-plane direction. This corresponds to the first and second exemplary embodiments.

Further, among the plurality of holes, the sectional area of the holes arranged in a predetermined direction may be gradually increased from one side to the other side. With this configuration, the following operation effect can be obtained.

For example, in the image display device shown in FIG. 7, when fluorescent screen 5 is seen from the direction perpendicular to the rear surface of fluorescent screen 5, and when light detecting section 3 is arranged to be located at the left end portion of fluorescent screen 5, the ratio of the fluorescence incident on light detecting section 3 from each of the fluorescent stripes of fluorescent screen 5 is reduced as the distance between light detecting section 3 and the fluorescent stripe is increased. For this reason, when a constant amount of excitation light is scanned on the fluorescent screen, the reception level of the noise portion superimposed on the detection signal of fluorescence that is emitted from the fluorescent stripe is gradually changed according to the distance between light detecting section 3 and the fluorescent stripe. In the following, the noise portion is referred to as offset.

When the fluorescent screen according to the other exemplary embodiment is configured such that the sectional area of the holes arranged in a predetermined direction (holes arranged in the horizontal direction in the above-described case) is gradually increased from one side to the other side (from the left side to the right side in the above-described case), the ratio of the fluorescence incident on light detecting section 3 from each of the fluorescent stripes of fluorescent screen 5 is substantially fixed regardless of the distance between light detecting section 3 and the fluorescent stripe. Thereby, the above-described offset can be cancelled.

Further, in the other exemplary embodiment, the plurality of holes may be provided in a matrix form.

Further, the transmittance of the reflecting layer with respect to the excitation light may also be substantially fixed at any position in the in-plane direction.

Further, the variation in the transmittance of the reflecting layer with respect to the excitation light in the in-plane direction may be 1% or less.

In the above, the present invention has been described with reference to the exemplary embodiments, but the present invention is not limited to the exemplary embodiments. A configuration and operation of the present invention may be modified in various ways without departing from scope of the present invention in a manner that a person skilled in the art can understand.

This application claims the benefit of priority based on Japanese Patent Application No. 2011-018387 filed in Japan on Jan. 31, 2011, the entire contents of which are hereby incorporated by reference in the application and claims of the present application.

What is claimed is:

1. A fluorescent screen comprising:
   a phosphor layer that includes a phosphor which absorbs excitation light to emit fluorescence;
   a reflecting layer that is provided on one surface of said phosphor layer so as to transmit the excitation light and to reflect, to said phosphor layer, a part of fluorescence that is emitted from the phosphor and that exits from the one surface; and
   a plurality of holes that penetrate said reflecting layer.

2. The fluorescent screen according to claim 1, further comprising
a substrate that is provided on the surface of said reflecting layer, the surface being opposite to the surface on the side of said phosphor layer, and transmits the excitation light,
wherein said plurality of holes are formed so as to penetrate said reflecting layer and said substrate.

3. The fluorescent screen according to claim 1, wherein said plurality of holes are provided periodically in the in-plane direction.

4. The fluorescent screen according to claim 1, wherein, among said plurality of holes, a sectional area of the holes arranged in a predetermined direction is gradually increased from one side toward the other side.

5. The fluorescent screen according to claim 1, wherein said plurality of holes are provided in a matrix form.

6. The fluorescent screen according to claim 1, wherein the transmittance of said reflecting layer with respect to the excitation light is substantially constant at any position in the in-plane direction.

7. The fluorescent screen according to claim 6, wherein the in-plane direction variation in transmittance of said reflecting layer with respect to the excitation light is 1% or less.

8. The fluorescent screen according to claim 1, wherein
said phosphor layer includes a plurality of fluorescent stripes respectively partitioned by black stripes, and
said plurality of holes are provided only in regions respectively facing said plurality of fluorescent stripes on said reflecting layer.

9. An image display device provided with the fluorescent screen according to claim 1 that includes a plurality of pixels, the image display device comprising:
an excitation light source that outputs excitation light;
a scanning section that scans one surface of said fluorescent screen with the excitation light outputted from said excitation light source;
a light detecting section that detects fluorescence that exits from the one surface of said fluorescent screen; and
a control section that makes said excitation light source emit a constant amount of excitation light, makes said scanning section perform the scanning operation, acquires an amount of fluorescence in each pixel of said fluorescent screen on the basis of an output value of said light detecting section, and adjusts the amount of the excitation light so that the acquired amount of fluorescence of each pixel becomes a predetermined value.

10. The image display device according to claim 9, wherein, at any position in the in-plane direction of said reflecting layer of said fluorescent screen, one hundred or more of said holes are included in a region of a beam spot of the excitation light, the beam spot being formed on said reflecting layer.

11. An image display device provided with the fluorescent screen according to claim 1 that includes a plurality of pixels.

12. The image display device according to claim 11, wherein, at any position in the in-plane direction of said reflecting layer of said fluorescent screen, one hundred or more of said holes are included in a region of a beam spot of the excitation light, the beam spot being formed on said reflecting layer.

13. An image display device provided with the fluorescent screen according to claim 1 that includes a plurality of pixels, the image display device comprising:
an excitation light source that outputs excitation light; and
a control section that makes said excitation light source emit a constant amount of excitation light.

14. An image display device provided with the fluorescent screen according to claim 1 that includes a plurality of pixels, the image display device comprising:
an excitation light source that outputs excitation light;
a scanning section that scans one surface of said fluorescent screen with the excitation light outputted from said excitation light source; and
a control section that makes said excitation light source emit a constant amount of excitation light and makes said scanning section perform the scanning operation.

15. The fluorescent screen according to claim 1, wherein the plurality of holes are formed at positions uniformly distributed in the in-plane direction.

16. The fluorescent screen according to claim 1, wherein the plurality of holes are formed at random positions distributed in the in-plane direction.

17. The fluorescent screen according to claim 1, wherein the part of the fluorescence that exits from the phosphor layer surface on the side of fluorescence reflecting film passes through the plurality of holes of the reflecting layer, and an other part of the fluorescence that exits from the phosphor layer surface on a side of reflecting layer is reflected by reflecting layer.

18. The fluorescent screen according to claim 1, wherein the plurality of holes penetrate said reflecting layer to a surface of the phosphor layer.

19. The fluorescent screen according to claim 1, wherein
said phosphor layer includes a plurality of fluorescent stripes, and
said plurality of holes are provided only in regions respectively facing said plurality of fluorescent stripes on said reflecting layer.

* * * * *